F. G. McKLVEEN & L. W. NAYLOR.
ENGINE STARTER FOR AUTOMOBILES.
APPLICATION FILED JAN. 12, 1912.
1,054,303.
Patented Feb. 25, 1913.
2 SHEETS—SHEET 1.
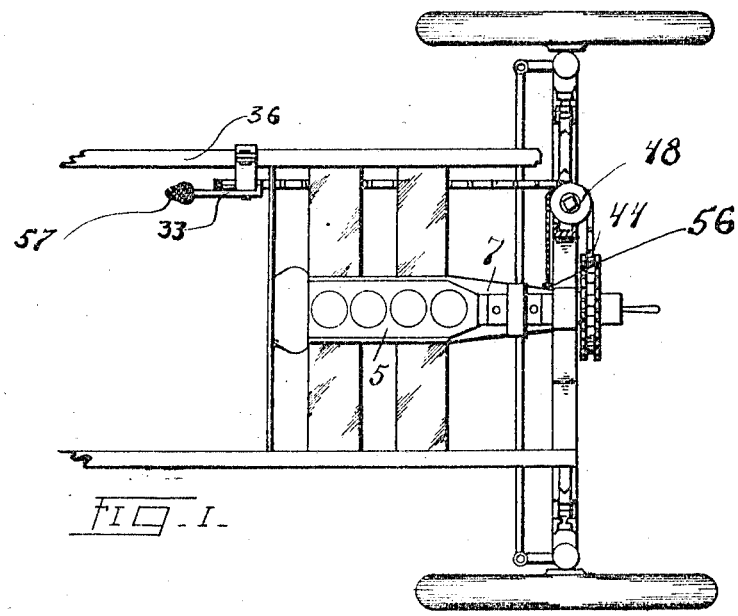
FIG. 1.
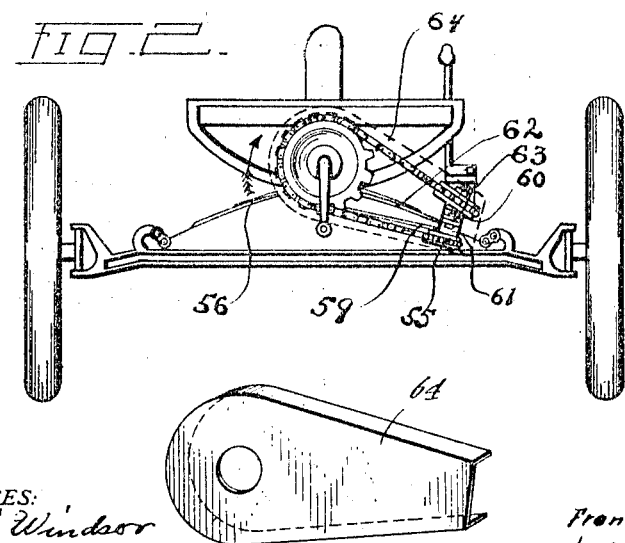
FIG. 2.
FIG. 15.
WITNESSES:
William E. Windsor
Olga Berley
INVENTORS
Frank G. McKlveen
Leslie W. Naylor
BY
Jno Howell
ATTORNEY.

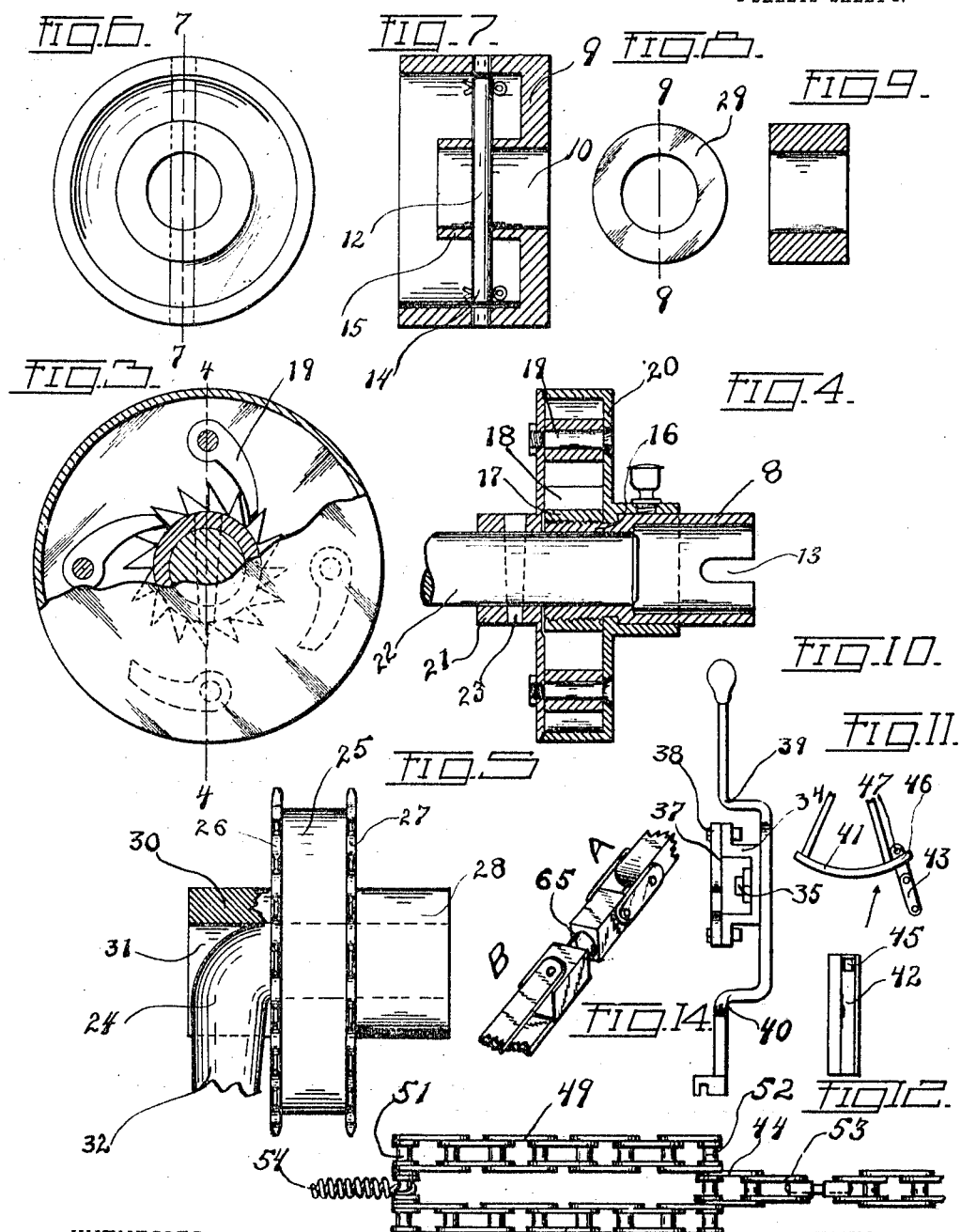

UNITED STATES PATENT OFFICE.

FRANK GROVE McKLVEEN AND LESLIE WILFRED NAYLOR, OF DENVER, COLORADO; SAID NAYLOR ASSIGNOR TO SAID McKLVEEN.

ENGINE-STARTER FOR AUTOMOBILES.

1,054,303.  Specification of Letters Patent. Patented Feb. 25, 1913.

Application filed January 12, 1912. Serial No. 670,953.

*To all whom it may concern:*

Be it known that we, FRANK G. MCKLVEEN and LESLIE W. NAYLOR, citizens of the United States, residing in the city and county of Denver and State of Colorado, have invented new and useful Improvements in Engine-Starters for Automobiles; and we do declare the following to be a full, clear, and exact description of our invention, such as will enable others skilled in the art to which it appertains to make and use the same, reference being had to the accompanying drawing, and to the figures of reference marked thereon, which form a part of this specification.

Our invention relates to improvements in engine-starters for automobiles and has for its object the provision of a simple, inexpensive and practical device for starting the engine from the driver's seat.

Another object of our invention resides in the provision of a starter for automobile engines, which may be readily and easily applied to any ordinary or generally known make of automobile.

Another object of our invention resides in the construction of an automobile engine starter, which may be readily applied to the most general make of automobiles without defacing or altering the construction of the automobile.

Another object of our invention resides in the provision of an automobile engine starter which obviates the necessity of cranking the engine by hand.

Still another object of our invention resides in the provision of an automobile engine starter which obviates the necessity of the driver either cranking the engine before getting into the automobile or dismounting from the automobile in order to crank the same.

With these and other objects in view we will proceed to describe our invention with reference to the accompanying drawings in which is illustrated an embodiment thereof.

In the drawings: Figure 1 is a top plan view of the front part of an automobile equipped with our improved starting mechanism. Fig. 2 is a front view of an automobile equipped with our improved starting mechanism. Fig. 3 is a detailed side view, partially broken away, illustrating the ratchet and pawl connection between the starter and the engine shaft. Fig. 4 is a cross section of the ratchet and pawl connection, taken on the line 4—4, Fig. 3. Fig. 5 is a plan view of the sprocket which is connected with the crank arm of the engine. Fig. 6 is an end view of a collar or female member applied to the end of the engine shaft. Fig. 7 is a cross section taken on the line 7—7, Fig. 6. Fig. 8 is an end view of a collar adapted to be applied to the crank between the sprocket and the ratchet. Fig. 9 is a cross section taken on the line 9—9, Fig. 8. Fig. 10 is a plan view of a lever employed in connection with our starting mechanism. Fig. 11 is a side view of a fragment of the lower portion of the lever shown in Fig. 10. Fig. 12 is a view looking in the direction of the arrow, Fig. 11. Fig. 13 is a plan view of a fragment of the chain employed in connection with our starter. Fig. 14 is a view illustrating a joint in the chain for changing the course of the latter. Fig. 15 is a detail view of a housing employed to cover the sprocket wheel and chain in front of the automobile.

The same reference characters indicate the same parts in all the views.

Let the numeral 5 designate the engine, 7 the pawl and ratchet in its entirety secured to the shaft of the engine 5, by means of a collar 8 which receives the extremity of the shaft. On the forward extremity of the engine shaft a collar or female member 9 is secured, the extremity of the engine shaft being passed through an opening 10 and a pin 12 is passed through the female member and the engine shaft for securing the said female member 9 in position against movement upon the engine shaft. The collar 8 is provided with slots 13, which receive the extremities 14 of the pin 12. By referring to Fig. 7 it may be noted that the pin 12 passes through a collar 15, which collar snugly fits on the interior of the collar 8. When the collar 15 of the female member 9 is received in the collar 8, the slots 13 of the latter are in position to receive the opposite extremities 14 of the pin 12 and thus connect the pawl and ratchet in a position to turn in unison with the crank shaft of the engine. The collar 8 is provided with a reduced threaded extension 16 upon which is threaded a ratchet collar 17, provided with teeth 18, which engage pivotally mounted pawls 19, these pawls being journaled in a housing 20, upon pins 21. The housing 20 is provided with a collar 21, which receives the extremity 22 of the crank for the engine. A pin 23 is passed through this collar 21 and the extremity 22 of the crank for rigidly securing together the pawl-carrying housing 20 and the crank.

Attention is here called to the fact that the pawl and ratchet are arranged on the interior of the engine housing and that the ratchet collar 17, carrying the teeth 18, is directly connected or made fast with the engine shaft in the manner heretofore described, while the pawl-carrying housing 20 and the pawls 19 are made fast or rigidly connected with the crank 24 of the engine.

On the exterior of the engine housing we arrange a sprocket-wheel 25 having two sets of sprocket teeth 26 and 27. This sprocket-wheel 25 is provided with a collar 28 which is journaled on the arm 22 of the crank 24 exteriorly of the engine housing. The extremity 22 of the crank 24 passes through the sprocket-wheel 25 and its collar 28 and extends into the collar 21 of the pawl housing 20, which is arranged on the interior of the engine housing the said extremity 22 of the crank 24 being connected or made fast in the housing 20 by the pin 23, which passes through the collar 21 and the extremity 22 of the crank shaft 24 as heretofore explained. In order to fill up the necessary space between the collar 28 of the sprocket 25 and the collar 21 of the pawl housing 20, we mount a collar 29 upon the extremity 22 of the crank 24 between the collar 28 of the sprocket-wheel 25 and the collar 21 of the pawl housing 20. The outer side of the sprocket-wheel 25 is provided with a collar 30 having a slot 31 adapted to receive the arm 32 of the crank 24, whereby whenever the sprocket-wheel 25 is turned, the crank 24 is turned therewith and the sprocket-wheel 25 is prevented from turning independently of the crank 24.

To one side of the frame work of the automobile we secure a lever 33. Intermediate the extremities of this lever, we secure a U-shaped member 34 by means of a bolt 35 and upon which bolt, the lever 33 is pivoted. This U-shaped member 34 straddles the side bar 36 of the automobile and a member 37 is secured to the U-shaped member 34 on the opposite side of the said member 36 by means of bolts 38. In this manner the lever is firmly secured in position and the necessity of drilling holes or in other respects altering the frame work of the automobile in order to secure the lever in proper position, is obviated. The opposite extremities of the lever 33 are offset as shown at 39 and 40, so that the said extremities of the lever lie in a plane parallel with the side member 36 of the automobile. The lower extremity of the lever 33 is sector-shaped as shown at 41 and is provided with a groove 42, which receives one extremity 43 of a chain 44, the said extremity 43, of the chain being passed through an opening 45 formed in an extension 46 of the sector-shaped extremity 41 of the lever 33 and secured in position or against withdrawal through the said opening 45 by means of a pin 47, which passes through the extremity 43 of the chain. This chain 44, passes forwardly from the lever 33 over a pulley 48, and thence over the sprocket 25. This chain 44 consists of two sections 49 and 50, suitably separated and connected together at their opposite extremities by means of pins 51 and 52. To the pin 52, between the two sections 49 and 50, is connected a single chain 53, while to the pin 51 is connected a spiral spring 54. It has been heretofore pointed out that one extremity of this chain 43, is connected with the sector-shaped extremity 41, of the lever 33 and that this chain passes over a pulley 48 and sprocket 25. Now, the opposite extremity of the spring 54, passes over a pulley 55 and is connected with one of the front springs of the automobile, as shown at 56, the double sections of the chain consisting of the parts 49 and 50 normally occupying a position out of engagement with the sprocket 25 as shown at 56.

Now, whenever it is desired to start the engine the lever 33 is actuated by pressing forwardly upon its pedal extremity 57, in the front of the car, whereby the sector-shaped extremity 41, of the lever, with which one extremity of the chain is connected, is caused to move rearwardly and pull the chain therewith against the tension of the spring 54. This action or movement of the chain 44 causes the two separated members 49 and 50, of the chain, to respectively engage the sprocket-teeth 26 and 27, thus turning the sprocket 25 in the direction of the arrow, Fig. 2, which in turn operates the crank 24 to turn the pawl housing 20 to cause the pawls 19 of the latter to engage the ratchet teeth 18, which are made fast to the engine shaft, in the manner heretofore described. Consequently, when the sprocket housing 20 is caused to turn, the pawls 19 engage the teeth 18 of the ratchet and impart a partial rotary movement to the engine shaft, resulting in starting the engine. After the shaft is started and the engine is working, the engine shaft moves independently of the pawl housing 20 and its pawls 19, which latter engage the ratchet only under the influence of gravity.

From the foregoing description it is apparent that the pawl housing 20, sprocket 25 and the other cranking mechanism connected therewith, remain stationary at all times except during the cranking operation.

Therefore with our improved engine starting mechanism, it is only necessary to move the lever 33 sufficiently to cause the two members or parts 49 and 50 of the chain 44 to impart a partial rotary movement to the sprocket 25. This rotary movement of the sprocket 25 also imparts a partial rotary movement to the crank 24, whereby the pawls 19 are brought into engagement with the ratchet teeth 18, whereby a corresponding movement is imparted to the engine shaft by virtue of the connection heretofore explained.

Attention is here called to the fact that the pawl housing 20 is provided with a collar 58, which is journaled upon the collar 8 to which the ratchet 17 is connected, and that this collar 58 is provided with an oil cup 59 for supplying lubricant between the collar 8 and collar 58 for the purpose of relieving friction and wear incident to the continuous revolving of the collar 8 and ratchet 17, during the time that the engine is in motion.

As soon as the lever 33 is released the spring 54, acts upon the chain 44, to cause the lever 32 to move back to its normal position and the parts 49 and 50, of the chain, to move out of engagement with the teeth 26 and 27 of the sprocket-wheel 25. This reverse movement of the chain 44, under the influence of the spring 54, causes the sprocket 25 to turn in the opposite direction until such time as the parts 49 and 50 of the chain have been disengaged from the teeth 26 and 27 of the sprocket wheel, at which time the parts 49 and 50 of the chain 44 occupy their normal position as shown at 56, in Fig. 2. For the purpose of freeing the parts 49 and 50 from the teeth 26 and 27, of the sprocket-wheel 25, we arrange a guard 59 directly above the normal position 56, which the parts 49 and 50 of the chain 44 occupy. This guard serves to prevent the parts 49 and 50 from following or clinging to the sprocket wheel 25 in its reverse movement.

Attention is here called to the fact that the pulleys 48 and 55 are connected with halves 60 and 61 respectively of a fastening member. These two halves 60 and 61 are arranged on opposite sides of the spring 62 and are bolted together as shown at 63. By virtue of this arrangement or manner of connecting these pulleys to the frame work of the automobile, the necessity of drilling holes in the spring or other portion of the frame work of the automobile is obviated. Each of these pulleys 48 and 55 occupies a position inclined to the horizontal, in order to accommodate the angles of the course of the chain 44.

In order to protect the mechanism in the front part of the automobile from dust and foreign substances, we cover the same or inclose it with a housing or protector 64, which may be secured in position in any suitable or desired manner. This protector 64, not only serves for protecting the starting mechanism from damage but conceals the same from view and thus preserves the neat appearance of the front of the automobile.

Attention is here called to the fact that the chain 44 is provided with a swivel joint as shown at 65, Fig. 14, in order to permit the chain to pass around the pulley 48 and to be extended rearwardly to the lever 33 parallel with the engine of the automobile as shown in Fig. 1. In other words, since all of the links in a chain of the character we employ, are journaled or connected together in the same direction they occupy the horizontal position. Consequently since the links in the part A of the chain are horizontally journaled, the chain could not be bent around the pulley 48 unless one of the links were vertically journaled as shown in the part B. By vertically journaling this link as shown in the part B, the course of the chain may be changed to permit the same to pass around the pulley 48.

Attention is here called to the fact that when the parts 49 and 50 of the chain 44 occupy their normal position, the single course or part 53 of the chain engages the sprocket wheel 25 between the teeth 26 and 27 and when the said part 53 is in such position, the engine of the automobile may be started in the usual manner by simply turning the crank 24, whereby the sprocket 25 will turn around on the part 53 of the chain 44 without causing the parts 49 and 50 of the said chain to engage the teeth 26 and 27 of the sprocket-wheel 25.

We have gone into the operation of our invention somewhat at length in connection with the foregoing description and it is not considered necessary to further follow out its operation.

We have described our invention in its application and use to automobiles but it must be understood that the invention may be used upon other motor propelled vehicles with equal advantages.

We have described and illustrated the specific construction of the various parts of our invention, however it is understood that all of these different parts may be, to a certain extent varied and modified according to the particular circumstances and conditions in the application of the invention and still be within the spirit of our invention as determined by the domain of the appended claims.

Having thus described our invention, what we claim is:

1. In an engine starter for automobiles the combination with an engine shaft, and the crank, of a pawl and ratchet connection between the engine shaft and the crank, the said pawl and ratchet connection being arranged on the interior of the engine housing, a double sprocket-wheel arranged on the exterior of the engine housing and connected with the crank to cause the latter to turn therewith, an operating lever secured to the frame work of the vehicle, a chain connected at one extremity of the said operating lever and passing over the aforesaid sprocket-wheel, a spring connecting the opposite extremity of the said chain with the frame work of the automobile, the said chain having two separated parts and the sprocket having two sets of separated sprocket-teeth adapted to be engaged by the aforesaid separated parts of the chain when the lever is actuated, whereby the sprocket-wheel is given a partial rotary movement which in turn operates the crank to cause the pawl and ratchet connection to impart a partial rotary movement to the engine shaft, the aforesaid spring acting upon the chain to disengage its two separated parts from the teeth of the sprocket-wheel after the lever has been released, substantially as described.

2. In an engine starter for automobiles, the combination with an engine shaft and a crank, of a pawl and ratchet connection interposed between the said engine shaft and the said crank, a sprocket-wheel connected with the crank, a chain passing over the said sprocket-wheel and having one extremity fixedly connected with the frame work of the automobile, a lever fulcrumed upon the frame work of the automobile and to one extremity of which the opposite extremity of the chain is connected, the said chain having two corresponding separated sets of sprocket teeth adapted to be engaged by the aforesaid separated parts of the chain whenever the lever is actuated, and means for returning the aforesaid separated parts of the chain out of engagement with the sprocket-wheel when the lever has been released, substantially as described.

3. In an engine starter for automobiles, the combination with the engine shaft, of a pawl and ratchet connected in operative relation with the aforesaid engine shaft, a fulcrumed lever, a chain having one extremity connected with one extremity of the aforesaid lever, the said chain passing over the sprocket-wheel and having its opposite extremity yieldingly connected, the said chain having two separated parts adapted to engage the teeth of the sprocket-wheel whenever the lever is actuated, whereby a partial rotary movement is imparted to the sprocket-wheel which in turn acts upon the pawl and ratchet to impart a corresponding partially rotary movement to the engine shaft, the aforesaid yielding connection of the chain acting upon the latter to return the separated parts out of engagement with the teeth of the sprocket-wheel after the lever has been released, substantially as described.

4. The combination with an engine shaft, of a wheel connected in operative relation therewith, a device for operating the same, a spring connected with one extremity of said device, the said device having a section normally held out of engagement with the wheel by the spring, said section being composed of two separated parts, and the wheel being equipped with two separated sets of sprocket teeth adapted to be engaged by said parts for operating the wheel, the wheel having a toothless space between the two sets of teeth, the said device beyond its section composed of the two separated parts adapted to normally engage the toothless space of the wheel between the two sets of teeth under the influence of the spring, whereby the wheel may rotate without moving the device, and means for actuating the device to operate the wheel for engine starting purposes, substantially as described.

5. The combination with an engine shaft, of a wheel connected in operative relation therewith, and equipped with two separated sets of sprocket teeth, the said wheel having a toothless space between the two sets of sprocket teeth, an operating lever, a device forming a connection between the operating lever and said wheel, a spring attached to one extremity of said device, the latter having a section composed of two separated parts normally held out of engagement with the wheel by the spring, the separated parts of said section corresponding in location with the teeth of the wheel to cause the wheel to turn when the said parts are moved into engagement with the said teeth, the said device beyond its active section and in line with the space between the two sets of teeth of the wheel adapted to normally engage the said space under the influence of the spring to permit the wheel to turn without moving the device, and the two separated parts of the active section of said device adapted to be brought into operative relation with the teeth of the wheel when the operating lever is actuated, for the purpose set forth.

6. The combination with an engine shaft, of a wheel connected in operative relation therewith and having two separated sets of teeth formed on the periphery thereof, the said wheel having a toothless space on its periphery between the two sets of teeth, an operating lever, a chain forming a connection between the operating lever and said wheel, a spring attached to one extremity of said chain, the latter having a section composed of two separated parts normally held out of engagement with the wheel by the spring, the said separated parts of the section corresponding in location with the teeth on the wheel and adapted to engage the teeth to operate the wheel, the said chain beyond its active section adapted to engage the toothless space of the wheel between the two sets of teeth, whereby the wheel may turn without moving the chain, and the said separated parts of the active section of the chain adapted to be brought into operative relation with the two sets of teeth of the said wheel when the operating lever is actuated for engine starting purposes, substantially as described.

In testimony whereof we affix our signatures in the presence of two witnesses.

FRANK GROVE McKLVEEN.
LESLIE WILFRED NAYLOR.

Witnesses:
 OLGA BERLEY,
 WILLIAM E. WINDSOR.